United States Patent

[11] 3,633,884

| [72] | Inventors | John F. Holmes<br>Andover, Mass.;<br>Donald P. Foudriat, Nashua, N.H. |
|---|---|---|
| [21] | Appl. No. | 60,368 |
| [22] | Filed | Aug. 3, 1970 |
| [45] | Patented | Jan. 11, 1972 |
| [73] | Assignee | Sanders Associates, Inc.<br>Nashua, N.H. |

[54] APPARATUS FOR REOXYGENATING A BODY OF WATER
9 Claims, 2 Drawing Figs.

[52] U.S. Cl.................................................. 261/122,
210/220, 210/170
[51] Int. Cl.................................................. B01f 3/04
[50] Field of Search.......................................... 261/122;
210/170, 220, 15, 63

[56] References Cited
UNITED STATES PATENTS

| 3,193,260 | 7/1965 | Lamb | 210/220 X |
|---|---|---|---|
| 3,470,091 | 9/1969 | Budd et al. | 210/220 X |
| 3,489,396 | 1/1970 | D'Aragon | 210/170 X |
| 3,505,213 | 4/1970 | Anthony et al. | 210/15 |

FOREIGN PATENTS

| 1,377,571 | 9/1964 | France | 210/220 |

OTHER REFERENCES

Journal Water Pollution Control Federation, Sept. 1960, pps. 939– 941, " Sewage Treatment By Oxygenation Through Permeable Plastic Films,"

*Primary Examiner*—Tim R. Miles
*Attorney*—Louis Etlinger

ABSTRACT: A body of water is reoxygenated at a controlled rate from a submerged cryogenic container of liquid oxygen which is vaporized into a permeable membrane diffusion chamber through which the oxygen is dissolved into the water in a molecular form.

PATENTED JAN 11 1972   3,633,884

INVENTORS
DONALD P. FOUDRIAT
JOHN F. HOLMES
BY Robert Han Epps
AGENT

APPARATUS FOR REOXYGENATING A BODY OF WATER

BACKGROUND OF THE INVENTION

1. Field of the Invention

The present invention relates generally to a new and novel method and apparatus for oxygenating a body of water and more particularly to a method and apparatus for accomplishing oxygenation with a minimum of oxygen loss.

2. Description of the Prior Art

Numerous eutrophic deep lakes which are subject to thermal stratification suffer from oxygen deficiency in the lower, cold strata and thus run out of oxygen in the late summer to early fall. Unstratified small ponds also suffer from oxygen depletion in the late winter and early spring before the ice melts and the surface is reexposed to the air. In both of these cases valuable cold water fish can be lost.

Prior to the present invention the most common methods of oxygenating a body of water were to either pump oxygen to an underwater diffuser generally in the form of a perforated pipe or sparger or to pump water through a pressure manifold for oxygenation and then return it to mix with the remainder of the body of water. With either of these approaches there is a requirement that the oxygenation equipment be operated from the shore of the body of water or from a raft or barge. Both generally require an attendant and both have proven to be subject to vandalism. Use of either of these methods further involves a very low efficiency in terms of the rate at which oxygen is actually dissolved in the water. For either method only about 15 percent to 20 percent of the oxygen introduced into the water is dissolved.

OBJECTIVES AND SUMMARY OF THE INVENTION

From the foregoing discussion it will be understood that among the objectives of the present invention are:

To provide a new and improved method and apparatus for replenishing the oxygen supply to a body of water.

To provide a method and apparatus of the above-described character which operates automatically.

To provide a method and apparatus of the above-described character which operates from the bottom of the body of water being treated.

To provide a method and apparatus of the above-described character of greatly improved efficiency.

To provide a method and apparatus of the above-described character for introducing oxygen into the water in molecular form.

The above and other objects of the present invention are efficiently attained by providing a submerged cryogenic container of liquid oxygen coupled to a permeable membrane diffusion chamber for diffusing oxygen in its molecular form into the water. Heat transfer from the water to the oxygen container is generally sufficient to vaporize the liquid oxygen at a predetermined rate. Ballasting of the apparatus may be accomplished such that on exhaustion of the liquid oxygen supply the entire apparatus surfaces automatically for retreival and refilling.

These and other objects, features and advantages of the present invention will become more apparent from the following detailed description taken in conjunction with the appended drawings.

DESCRIPTION OF PREFERRED EMBODIMENT

Figure 1:
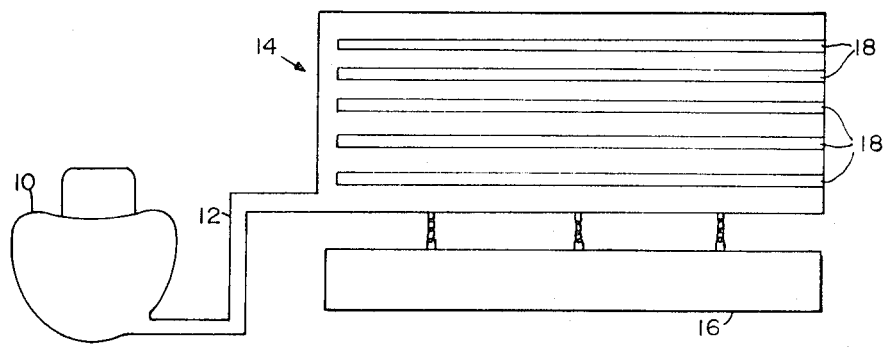
FIG. 1 is a schematic illustration of reoxygenation apparatus in accordance with the principles of the present invention.

Turning now to FIG. 1 a submerged water-reoxygenation apparatus constructed in accordance with the present invention is schematically illustrated. A cryogenic container 10 of oxygen in liquid form is coupled by a vaporization coupling 12 to a permeable membrane diffusion chamber 14 secured to the bottom of the body of water by an anchor 16. The liquid oxygen in the coupling 12 is vaporized by the heat transferred through the wall of the coupling 12 from the surrounding water. The gaseous oxygen flows into the diffusion chamber 14 which may for example be formed of a series of parallel silicone tubes 18. It has been found by the Applicants that a 1-mil-thick silicone membrane or a polycarbonate silicone copolymer such as MEM-213 commercially available from General Electric Chemical and Medical Division of Schenectady, N.Y. will permit molecular oxygen permeation at a rate of about 50 and 16 liters per hour per square yard of surface respectively with a one atmosphere pressure differential across the membrane. An alternative approach is to use very long lengths of ultrafine capillary formed of MEM-213 also available from General Electric. In the preferred embodiments of the invention the surface area of the diffusion chamber 14 is maximized while the internal volume is minimized. In this manner the mass of the anchor 16 may be held reasonably low.

Through the use of an oxygen permeable membrane structure at or close to the bottom of the body of water substantially 100 percent efficiency of oxygen use is provided. The molecular oxygen is dissolved directly into the water without the formation of bubbles and the substantial elimination of bubbles provides a corresponding substantial elimination of loss of undissolved oxygen to the atmosphere at the surface.

Assuming now by way of illustration that it is desired to oxygenate a million cubic feet of water by adding five parts of oxygen per million parts of water over a period of 10 days, it is necessary to dissolve a total of 32.8 gallons of liquid oxygen at a diffusion rate of 15.7 standard cubic feet per hour (SCFH). The liquid oxygen is stored at a temperature of $-280°$ F. and, of course, the water temperature at the bottom of a deep lake is $39.2°$ F. At this temperature differential of 319.2 degrees a heat transfer rate of 229 B.t.u. per hour is required to maintain the desired oxygen vaporization rate. It has been found that the normal heat transfer through typical cryogenic containers is sufficient to vaporize an adequate quantity of liquid oxygen and a separate vaporization means is not generally required in the practice of the invention. Thus the permeable membrane diffusion structure must be of a sufficient area to accommodate the oxygen flow in order to prevent oxygen loss through bubbling. At the desired diffusion rate of 15.7 SCFH a diffusing surface of about nine square yards is required.

Figure 2:
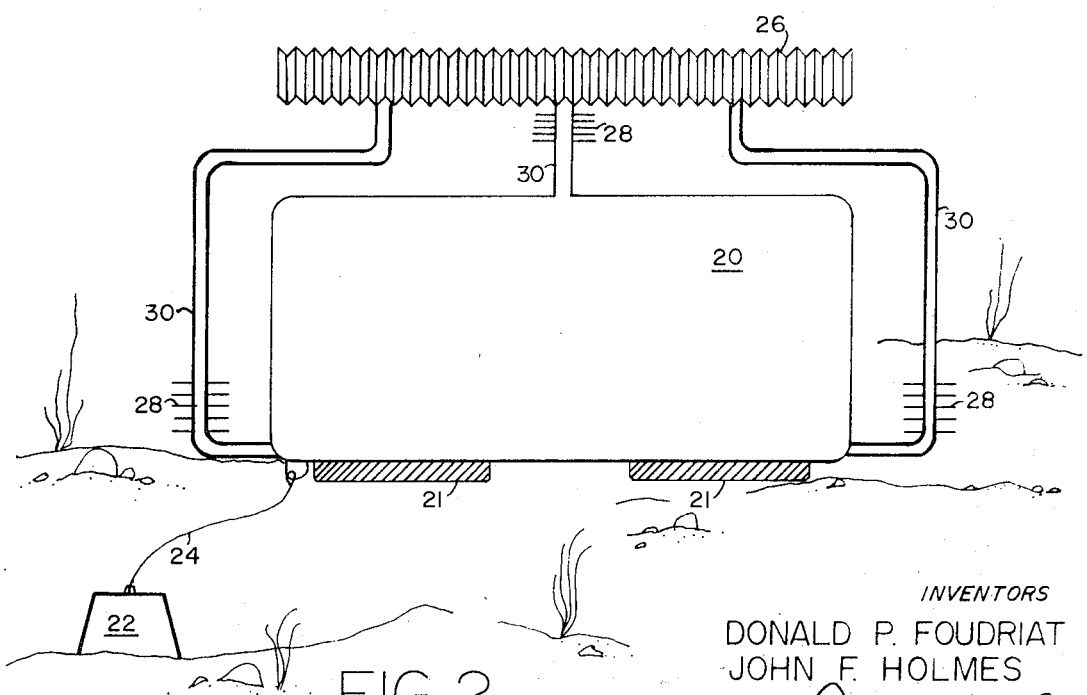
FIG. 2 is a more detailed schematic, elevation view of a self surfacing embodiment of the present invention.

FIG. 2 is a schematic elevation view of a water-reoxygenation apparatus according to the present invention having a permeable membrane diffusion chamber of improved efficiency and having a self-surfacing feature. Liquid oxygen is heavier than water and a full cryogenic container 20 will thus sink to the bottom. As the liquid oxygen is expended the container 20 will reach a point of positive buoyancy and float to the surface. By properly ballasting the container 20 with weights 21 it may be made to become positively buoyant just at the point when the liquid oxygen supply has been substantially consumed. The container 20 may be secured to an anchor 22 by a line 24 coiled within the anchor 22 such that the container will remain in position at or near the surface until retreived.

Also illustrated in FIG. 2 is an alternative embodiment of the diffusion chamber 26. Through the use of an accordion-pleated configuration the total exposed surface is maximized and volume is minimized as is preferred in the practice of the invention. There is further illustrated a heat exchanger in the form of fins 28 affixed to the vaporization couplings 30 between the cryogenic container 20 and the diffusion structure 26. As stated hereinabove the use of a heat exchanger is not generally required in the practice of the present invention since heat transfer from the water through the container 20 is usually sufficient to provide an adequate liquid oxygen vaporization rate. In very well insulated containers, however, a heat exchanger may be used to maintain a desired vaporization rate.

From the foregoing discussion it will be clear that the applicants have conceived a new and novel water-reoxygenation apparatus wherein the objectives set forth hereinabove are efficiently attained. Since certain changes in the above construction will occur to those skilled in the art without departing from the scope of the invention it is intended that all matter contained in the description of the invention or shown in the appended drawings shall be taken as illustrative and not in a limiting sense.

Having described what is new and novel and desired to secure by Letters Patent, what is claimed is:

1. Apparatus for introducing oxygen into a body of water comprising a cryogenic container of liquid oxygen,
   a diffusion chamber comprising a membrane structure permeable to oxygen in its gaseous molecular form,
   means for vaporizing said liquid oxygen at a predetermined rate,
   means for coupling said cryogenic container to said membrane structure such that said vaporized oxygen flows therethrough, and
   means for anchoring said container and said diffusion chamber to the bottom of said body of water and submerged therein,
   whereby molecular oxygen permeating said membrane structure is diffused into said water.

2. Apparatus as recited in claim 1 wherein
said diffusion chamber comprises a plurality of communicating tubular elements.

3. Apparatus as recited in claim 1 wherein
said diffusion chamber is formed of a silicone membrane.

4. Apparatus as recited in claim 1 wherein
said diffusion chamber is formed of a polycarbonate silicone copolymer membrane.

5. Apparatus as recited in claim 1 wherein
said diffusion chamber comprises an ultrafine capillary structure.

6. Apparatus as recited in claim 5 wherein
said capillary structure is formed of a polycarbonate silicone copolymer material.

7. Apparatus as recited in claim 1 wherein
said vaporizing means comprises heat-exchanging fins disposed in a heat transfer relationship with said coupling means whereby heat is transferred from said body of water through said coupling means to said liquid oxygen.

8. Apparatus as recited in claim 1 further including
ballasting means fixed to said cryogenic container such that when substantially empty of liquid oxygen said container is positively buoyant,
whereby said container floats to the surface of said body of water when said liquid oxygen is substantially exhausted.

9. Apparatus as recited in claim 8 further including
means for securing said positively buoyant container to said anchoring means.

* * * * *